United States Patent
Beuting

(10) Patent No.: US 7,661,746 B2
(45) Date of Patent: Feb. 16, 2010

(54) SYSTEM FOR FASTENING A WINDSHIELD TO A VEHICLE PART

(75) Inventor: Guido Beuting, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 12/328,080

(22) Filed: Dec. 4, 2008

(65) Prior Publication Data

US 2009/0079220 A1 Mar. 26, 2009

Related U.S. Application Data

(63) Continuation of application No. PCT/EP2007/004511, filed on May 22, 2007.

(30) Foreign Application Priority Data

Jun. 8, 2006 (DE) .................. 10 2006 026 628

(51) Int. Cl.
  *B62J 17/04* (2006.01)
(52) U.S. Cl. ..................................... 296/78.1
(58) Field of Classification Search ............... 296/78.1
  See application file for complete search history.

(56) References Cited

U.S. PATENT DOCUMENTS

| | | | | |
|---|---|---|---|---|
| 4,423,901 A | * | 1/1984 | Shumard et al. ........... | 296/78.1 |
| 4,738,468 A | * | 4/1988 | Baron ........................ | 280/771 |
| 5,785,374 A | * | 7/1998 | Aoki et al. ................ | 296/78.1 |
| 6,042,171 A | * | 3/2000 | Hesse ........................ | 296/78.1 |
| 6,196,614 B1 | | 3/2001 | Willey | |
| 6,808,219 B2 | * | 10/2004 | Barber et al. ............ | 296/78.1 |
| 7,178,858 B1 | * | 2/2007 | Hesse ....................... | 296/180.1 |
| 2005/0161970 A1 | | 7/2005 | Willey | |
| 2006/0087143 A1 | | 4/2006 | Willey | |
| 2009/0076684 A1 | * | 3/2009 | Seidl ........................ | 701/42 |

FOREIGN PATENT DOCUMENTS

| | | |
|---|---|---|
| DE | 1 004 952 | 3/1957 |
| DE | 10 2004 032 241 A1 | 1/2006 |
| EP | 1 369 345 A1 | 12/2003 |
| EP | 1 418 119 A2 | 5/2004 |
| EP | 1 642 811 A1 | 4/2006 |

OTHER PUBLICATIONS

German Search Report dated Jan. 31, 2007 w/English translation of pertinent portions (nine (9) pages).
International Search Report dated Sep. 28, 2007 w/English translation of pertinent portions (five (5) pages).

* cited by examiner

*Primary Examiner*—Dennis H Pedder
(74) *Attorney, Agent, or Firm*—Crowell & Moring LLP

(57) ABSTRACT

A system for fastening a windshield to a vehicle part, particularly a fork bridge and instrument support of a motorcycle, is provided. The system includes a holder permanently attached to the windshield. The holder has a transverse tube in the lower forward area, and a claw-type receiving part open toward the rear and which can be fastened to the instrument support in a permanent manner. The transverse tube of the holder can be inserted into the claw-type receiving part, and the rearward area of the holder can be detachably connected with the fork bridge.

3 Claims, 1 Drawing Sheet

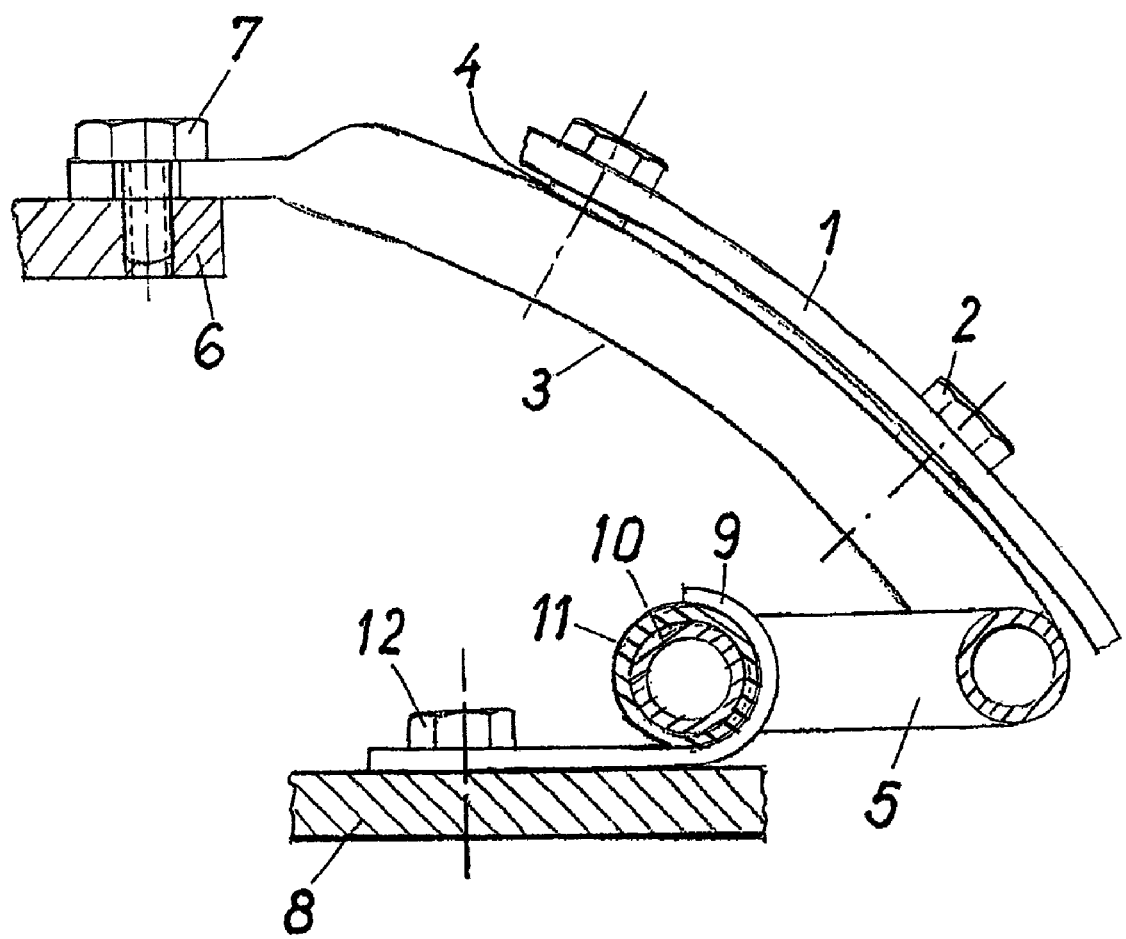

SYSTEM FOR FASTENING A WINDSHIELD TO A VEHICLE PART

CROSS-REFERENCE TO RELATED APPLICATIONS

This application is a continuation of PCT International Application No. PCT/EP2007/004511, filed on May 22, 2007, which claims priority under 35 U.S.C. §119 to German Application No. 10 2006 026 628.5, filed Jun. 8, 2006, the entire disclosures of which are expressly incorporated by reference herein.

BACKGROUND AND SUMMARY OF THE INVENTION

The invention relates to a system for fastening a windshield to a vehicle part, particularly to the fork bridge and instrument support of a motorcycle. The system includes a holder which is durably connected with the windshield and which can be connected with the fork bridge and with the instrument support.

When the connection of the holder with the fork bridge and with the instrument carrier is constructed in a detachable manner, the unit consisting of the holder and the therewith permanently attached windshield can be exchanged for another unit where the windshield has different dimensions. The owner of the motorcycle is thereby provided with the possibility of optionally equipping the motorcycle with a larger or a smaller windshield corresponding to the respective weather conditions.

In the case of known systems for fastening a windshield, the mounting and also the demounting is relatively complicated and time-consuming. The exchange of one windshield for another windshield having different dimensions is therefore not possible within a brief time period.

It is an object of the invention to create a system of the above-mentioned type, which makes it possible to rapidly demount a mounted windshield and, as required, exchange it for one with different dimensions.

According to the invention, this object is achieved in that the holder has a transverse tube in the lower forward area. A claw-type receiving part open toward the rear is permanently fastened to the instrument support, into which receiving part the transverse tube can be inserted. The rearward area of the holder can be detachably connected with the fork bridge.

For demounting the windshield according to the invention, it is only necessary to release the connection of the holder with the fork bridge, whereupon the holder can be pulled out of the claw-type receiving part toward the rear. For installing a windshield with other dimensions, the transverse tube of its holder is inserted from the rear into the claw-type receiving part, and the rearward region of the holder is then releasably connected with the fork bridge. These operations can be carried out in a rapid and simple manner.

In order to avoid possible rattling noises, it is provided according to a further development of the system according to the invention that the fork bridge has threaded bores, and that the holder is provided with openings in the rearward region, which openings are slightly offset with respect to the threaded bores so that the holder is prestressed in the installed condition. To maintain the prestress, the transverse tube of the holder and/or the claw-type receiving part is preferably coated with an elastic material which is compressed in the installed condition.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE of the drawing shows a schematic lateral view of a windshield for a motorcycle in the installed condition.

DETAILED DESCRIPTION OF THE DRAWING

A windshield 1 made of a transparent material is fixedly and durably connected with a holder by use of screws 2. Panes 4 made of a preferably elastic material are arranged between the windshield 1 and the holder. The holder consists of an open tube bend 3 to whose transverse part a U-shaped bracket 5 is welded. The two free ends of the tube bend 3 are provided with openings for receiving fastening screws 7. In a fork bridge 6 of a motorcycle (not shown), threaded bores are arranged into which the fastening screws 7 can be screwed. A claw-type receiving part 9 open toward the rear is durably fastened to an instrument support 8 of the motorcycle, for example, by use of self-locking screws 12. The transverse tube 10 of the bracket 5 is provided with a covering 11 made of an elastic material.

For mounting the windshield 1 connected with the holder, the transverse tube 10 of the bracket 5 is inserted from the rear into the claw-type receiving part 9. The distance of the threaded bores arranged in the fork bridge 6 from the claw-type receiving part 9 is selected such that the openings arranged in the open ends of the tube bend 5 are slightly offset toward the rear with respect to the threaded bores. For screwing-in the fastening screws 7, the holder therefore has to be displaced so far toward the front while compressing the elastic covering 11 that the openings are aligned with the threaded bores. After the fastening screws 7 were screwed into the fork bridge 6, as a result of the compression of the covering 11, the holder will be prestressed so that rattling noises are prevented.

For demounting the windshield, the two fastening screws 7 are removed, and the holder is displaced so far toward the rear that the transverse tube 10 is released from the receiving part 9. Then, the holder together with the windshield 1 fastened thereto can be lifted upward.

The preassembled constructional unit consisting of the windshield 1 and the holder may be offered in different embodiments. In this case, the distance of the transverse tube 10 of the holder from the fastening openings at the free ends of the tube bend 3 is identical in each case. However, the dimensions and/or the shape of the windshield 1 may be different. The owner of the motorcycle is therefore provided with the possibility of rapidly and easily, as required, exchanging the mounted windshield for a different one.

TABLE OF REFERENCE NUMBERS

1 Windshield
2 screws
3 tube bend
4 panes
5 bracket
6 fork bridge
7 fastening screws
8 instrument carrier
9 receiving part
10 transverse tube
11 covering
12 screws The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for fastening a windshield to a fork bridge and to an instrument support of a motorcycle, comprising:
   a holder connected with the windshield, the fork bridge and the instrument support, and having a transverse tube in a lower forward region thereof; and
   a claw-type receiving part configured to be open in a rearward direction of the motorcycle and to be connected to the instrument support such that the transverse tube is insertable into the receiving part; and
   wherein a rearward region of the holder is configured to be detachably connected with the fork bridge.

2. The system according to claim 1, wherein the fork bridge has threaded bores, and the holder is provided with openings in a rearward region thereof, which openings are slightly offset with respect to the threaded bores, whereby the holder is prestressed when connected with the fork bridge.

3. The system according to claim 2, wherein at least one of the transverse tube of the holder and the claw-type receiving part is covered with an elastic material.

* * * * *